(12) United States Patent
Quach et al.

(10) Patent No.: US 9,976,423 B2
(45) Date of Patent: May 22, 2018

(54) AIRFOIL SHOWERHEAD PATTERN APPARATUS AND SYSTEM

(71) Applicant: United Technologies Corporation, Hartford, CT (US)

(72) Inventors: San Quach, East Hartford, CT (US); Christopher King, Bristol, CT (US); Steven Bruce Gautschi, Naugatuck, CT (US); David J. Candelori, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 313 days.

(21) Appl. No.: 14/862,422

(22) Filed: Sep. 23, 2015

(65) Prior Publication Data
US 2016/0177734 A1 Jun. 23, 2016

Related U.S. Application Data

(60) Provisional application No. 62/096,158, filed on Dec. 23, 2014.

(51) Int. Cl.
*F01D 5/18* (2006.01)
*F01D 5/14* (2006.01)

(52) U.S. Cl.
CPC ............. *F01D 5/186* (2013.01); *F01D 5/141* (2013.01); *F05D 2240/303* (2013.01); *F05D 2240/305* (2013.01); *F05D 2240/306* (2013.01); *F05D 2250/324* (2013.01); *F05D 2260/202* (2013.01); *Y02T 50/671* (2013.01); *Y02T 50/673* (2013.01); *Y02T 50/676* (2013.01)

(58) Field of Classification Search
CPC .... F01D 5/141; F01D 5/186; F05D 2240/303; F05D 2240/305; F05D 2240/306; F05D 2250/324; F05D 2260/02; Y02T 50/676
See application file for complete search history.

(56) References Cited

U.S. PATENT DOCUMENTS 4,767,261 A * 8/1988 Godfrey .................. F01D 5/186 415/115
4,827,713 A 5/1989 Peterson et al.
(Continued)

FOREIGN PATENT DOCUMENTS

EP 0935703 8/1999
EP 2138675 12/2009
(Continued)

OTHER PUBLICATIONS

Invitation Pursuant to Rule 62a(1) EPC and Rule 63(1) EPC dated May 2, 2016 in European Application No. 15191352.2.
(Continued)

*Primary Examiner* — Ninh H Nguyen
(74) *Attorney, Agent, or Firm* — Snell & Wilmer L.L.P.

(57) ABSTRACT

The systems and methods described herein adapt the orientation, position and/or diffusion angles of showerhead cooling holes depending on the external gas/streamline flow direction. In regions, for example, where the stagnation line is on the pressure side, the breakouts of the showerhead holes substantially face aft (e.g., primarily towards the suction side). The location and positioning of the holes may be oriented according to the direction of incoming gas flows.

15 Claims, 6 Drawing Sheets

(56) References Cited

U.S. PATENT DOCUMENTS

| | | | | |
|---|---|---|---|---|
| 5,281,084 A * | 1/1994 | Noe | F01D 5/186 |
| | | | 415/115 |
| 5,779,437 A * | 7/1998 | Abdel-Messeh | F01D 5/186 |
| | | | 415/115 |
| 6,932,572 B2 * | 8/2005 | Kohli | F01D 5/141 |
| | | | 415/115 |
| 8,672,613 B2 * | 3/2014 | Bunker | F01D 5/186 |
| | | | 29/557 |
| 8,858,176 B1 * | 10/2014 | Liang | F01D 5/186 |
| | | | 416/97 R |

FOREIGN PATENT DOCUMENTS

| | | |
|---|---|---|
| EP | 2679772 | 1/2014 |
| EP | 2960433 | 12/2015 |
| WO | 2014137686 | 9/2014 |
| WO | 2015134006 | 9/2015 |
| WO | 2015163949 | 10/2015 |

OTHER PUBLICATIONS

"Streamlines, Streaklines, and Pathlines," Wikipedia—The Free Encyclopedia, Dec. 8, 2014 (Dec. 8, 2014), retrieved from https://en.wikipedia.org/w/index.php?title=Special:Book&bookcmd=download&collection_id=7632d0d5a022fcb6cbc3a6a64008efe6%2C+streaklines%2C+and+pathlines.

Extended European Search Report dated Aug. 30, 2016 in European Application No. 15191352.2.

* cited by examiner

AIRFOIL SHOWERHEAD PATTERN APPARATUS AND SYSTEM

CROSS-REFERENCE TO RELATED APPLICATIONS

This application is a nonprovisional of, and claims priority to, and the benefit of U.S. Provisional Application No. 62/096,158, entitled "AIRFOIL SHOWERHEAD PATTERN APPARATUS AND SYSTEM," filed on Dec. 23, 2014, which is hereby incorporated by reference in its entirety.

GOVERNMENT LICENSE RIGHTS

This disclosure was made with government support under contract No. N00019-12-D-0002 awarded by the United States Navy. The government has certain rights in the disclosure.

FIELD

The present disclosure relates generally to a gas turbine engine and more specifically to turbine blades and/or vanes exposed to high temperature.

BACKGROUND

A gas turbine engine may include a turbine section with multiple rows or stages of stator vanes and rotor blades that interact or react with a high temperature gas flow to create mechanical power (See prior art FIG. 1). In a gas turbine engine, the turbine rotor blades drive the compressor and/or an electric generator to generate electrical power.

The efficiency of the engine can be increased by passing a higher temperature gas flow through the turbine. However, the turbine inlet temperature is limited to the vane and blade (airfoils) material properties and the cooling capabilities of these airfoils. The first stage airfoils are exposed to the highest temperature gas flow since these airfoils are located immediately downstream from the combustor. The temperature of the gas flow passing through the turbine progressively decreases as the rotor blade stages extract energy from the gas flow. The leading edge of the vane and blade airfoils is exposed to high temperature gas flow.

A "high lift" airfoil design is an airfoil shape that allows for reduced airfoil count due to its ability to extract more work than a conventional airfoil. High lift airfoils provide an improvement in efficiency and weight reduction. In using a high lift design, the airfoil stagnation point is shifted from the leading edge nose, where it is located on a conventional airfoil, to the pressure side towards the tip. In addition, the suction side gage line, in which the gas Mach number is at the greatest, on a high lift airfoil occurs much closer to the leading edge nose than a conventional airfoil. Moreover, a High Lift airfoil is defined as an airfoil with a Zweifel load coefficient of greater than 1.1

SUMMARY

In various embodiments, a gas turbine component having a showerhead cooling hole is described. The component may comprise a pressure side row of radially disposed showerhead cooling holes. A breakout of the cooling holes may be configured to alter the vector of cooling air to align with a cooling flow streamline. Cooling hole exit diffusion may be configured to reduce the velocity of the cooling fluids to create an effective film cooling layer. The cooling holes may be configured to alter the vector of cooling air away from a stagnation zone. The cooling holes may be disposed on a leading edge of at least one of turbine blade or a turbine vane. The cooling holes may be disposed on a high lift airfoil. The stagnation zone and the leading edge of the high lift airfoil may be offset.

According to various embodiments, the cooling holes may be formed through an additive manufacturing process or electric discharge machining process. The cooling holes may be configured to alter the vector of cooling air between about 0 to about 90 degrees from the radial direction of the airfoil.

The cooling holes may be curved to orient the flow of cooling air out of the cooling holes in a direction closely aligned with the cooling flow streamline.

According to various embodiments, a forward edge of a breakout opening of a showerhead cooling hole comprises a first point and an aft most edge of the breakout opening of the showerhead cooling hole comprises a second point, wherein the first point and second point form a line which is between about 0 and 90 degrees from the radial direction of the gas turbine component. The line is aligned with the cooling flow streamline. The airfoil component may be a turbine blade. The airfoil may be a high lift airfoil. The high lift airfoil comprises a Zweifel lift coefficient of greater than 1.1. A vector of a cooling air streamline may be altered away from at least one of a suction side or pressure side stagnation zone.

According to various embodiments, an airfoil component is disclosed herein. The airfoil component may include a cooling hole. The cooling hole may include a diffusion angle. The cooling hole may be configured to alter the vector of cooling air to align with a cooling flow streamline. The cooling hole may be located in close proximity to a leading edge of the airfoil. For instance, the cooling hole may be located in the showerhead region of the airfoil. The cooling hole may be configured to alter the vector of cooling air towards a suction side stagnation zone. The airfoil is a high lift airfoil. The stagnation zone and the leading edge of the high lift airfoil are at least partially offset. The cooling hole may be an additive manufactured or electric discharge machined cooling hole.

According to various embodiments, a method of vectoring cooling air flow is disclosed herein. The method may include disposing a row of cooling holes radially on an airfoil. The method may include orienting a breakout of the cooling hole to substantially aligning the angle with the direction of a cooling flow streamline.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
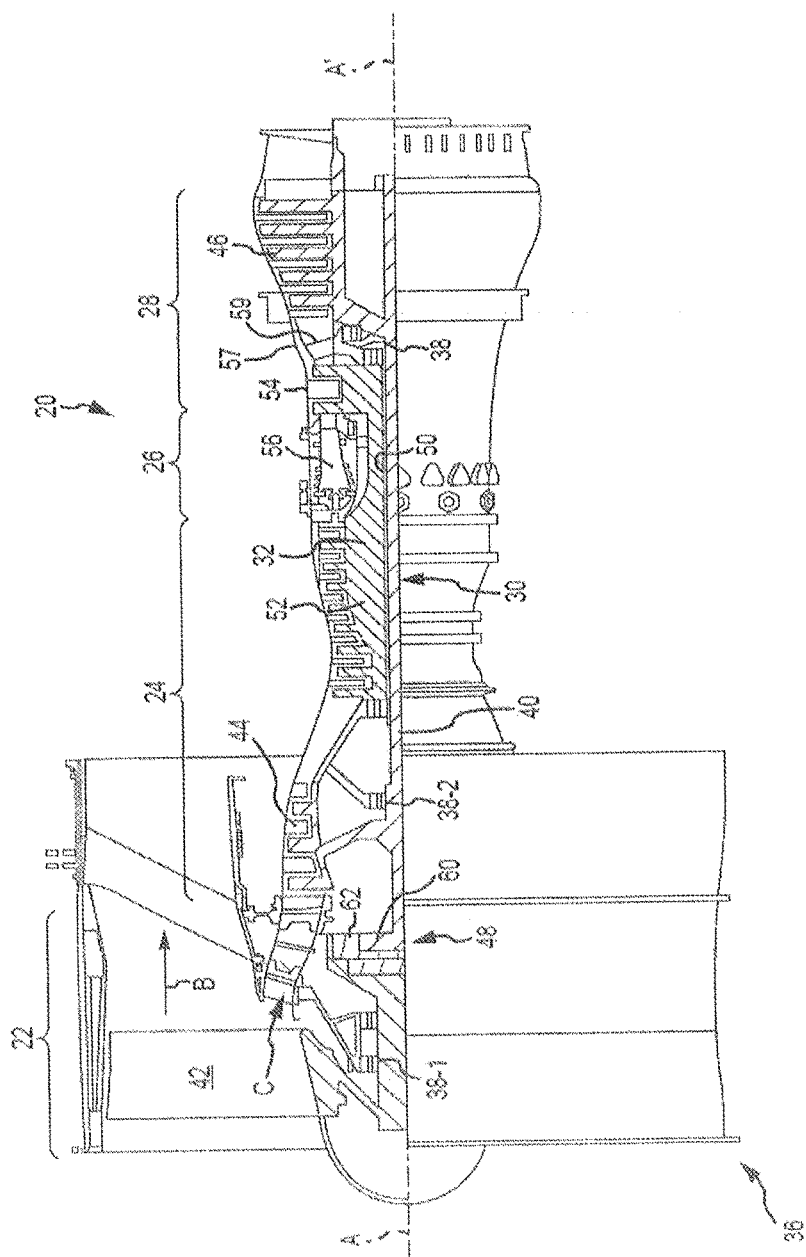
FIG. 1 illustrates an engine cross section of prior art turbines.

With reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air along path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 1). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46 and high pressure turbine 54 rotationally drive the respective low speed spool 30 and high speed spool 32 in response to the expansion.

Gas turbine engine 20 may be, for example, a high-bypass geared aircraft engine. The bypass ratio of gas turbine engine 20 may be greater than about six (6). The bypass ratio of gas turbine engine 20 may be greater than ten (10). Geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. The bypass ratio of gas turbine engine 20 is greater than about ten (10:1). The diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

The next generation of turbofan engines may be designed for higher efficiency which may be associated with higher pressure ratios and higher temperatures in the HPC 52 than is conventional. These higher operating temperatures and pressure ratios may create operating environments that may cause thermal loads that are higher than the thermal loads typically encountered, which may shorten the operational life of current components.

HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., an outer diameter).

Rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by a rotor.

As noted above and with reference to FIG. 1, turbine blades and vanes are subject to a high external heat load that is localized to the stagnation location which is the location where the hot combustion gases impinge on the airfoil. The stagnation point on an airfoil is where the airfoil surface Mach number is essentially zero, meaning the static and total pressures are the same. For some high lift designs, the stagnation point shifts from the airfoil nose to the pressure side. The showerhead region includes a series of holes located at a stagnation location along the leading edge of the blade, which is the location where the hot gas flow directly impinges on the airfoil. The showerhead region is prone to high cycle fatigue (HCF), erosion, oxidation, thermal-mechanical fatigue, and coating spallation, which is typically directly dependent on the local material temperature near the cooling holes. Showerhead cooling holes may comprise cooling holes, often machined into a leading edge of a vane or blade, and are configured to at least partially offset the high external heat load.

Turbine airfoils or outer air seals operate in an environment where the gas temperatures often exceed the material capability, therefore they benefit from cooling features to protect against damage. Cooling air from the compressor may be directed to the airfoils and provides internal convection cooling inside the airfoils. The addition of large volumes cooling air tends to result in a decrease in the amount of gas available for work extraction, therefore, the engine efficiency tends to be reduced. As demands increase for higher thrust or efficiency, the airfoil designer is faced with increasing turbine inlet temperatures or reducing cooling flow allocation.

Figure 2:
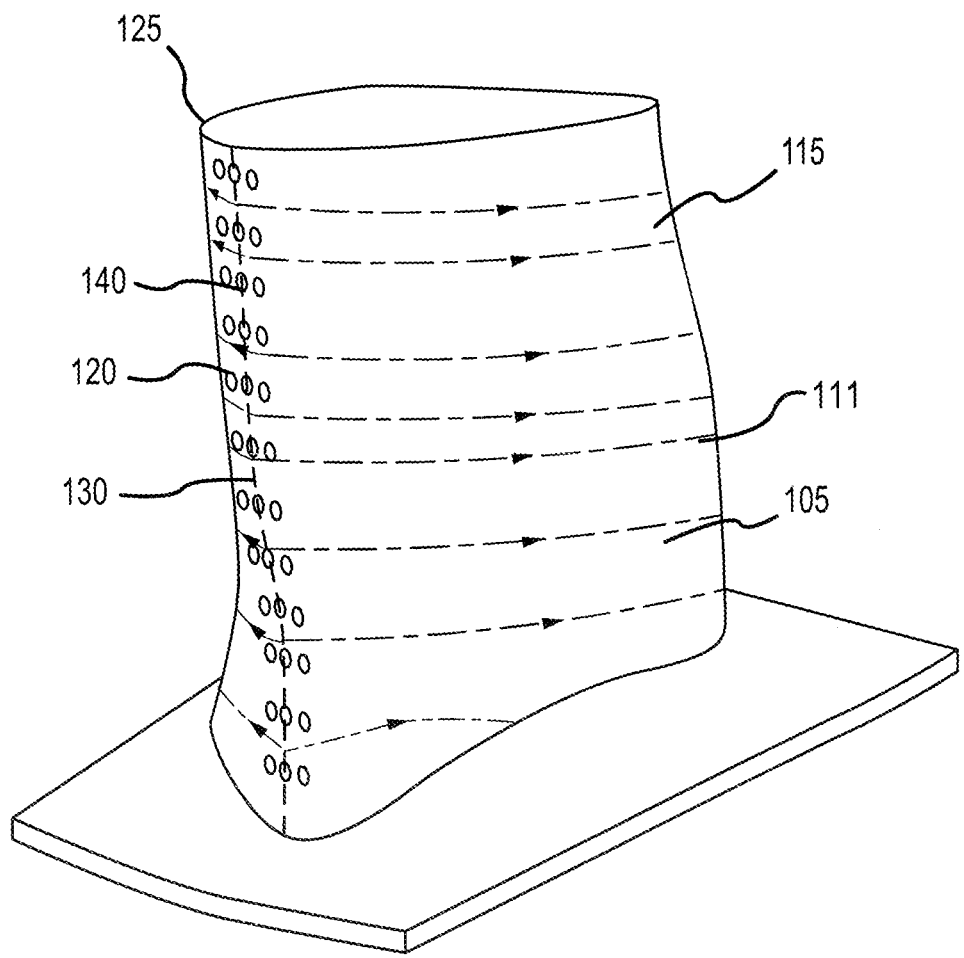
FIG. 2 illustrates a partial isometric view of conventional gas turbine airfoil component.
Figure 3:
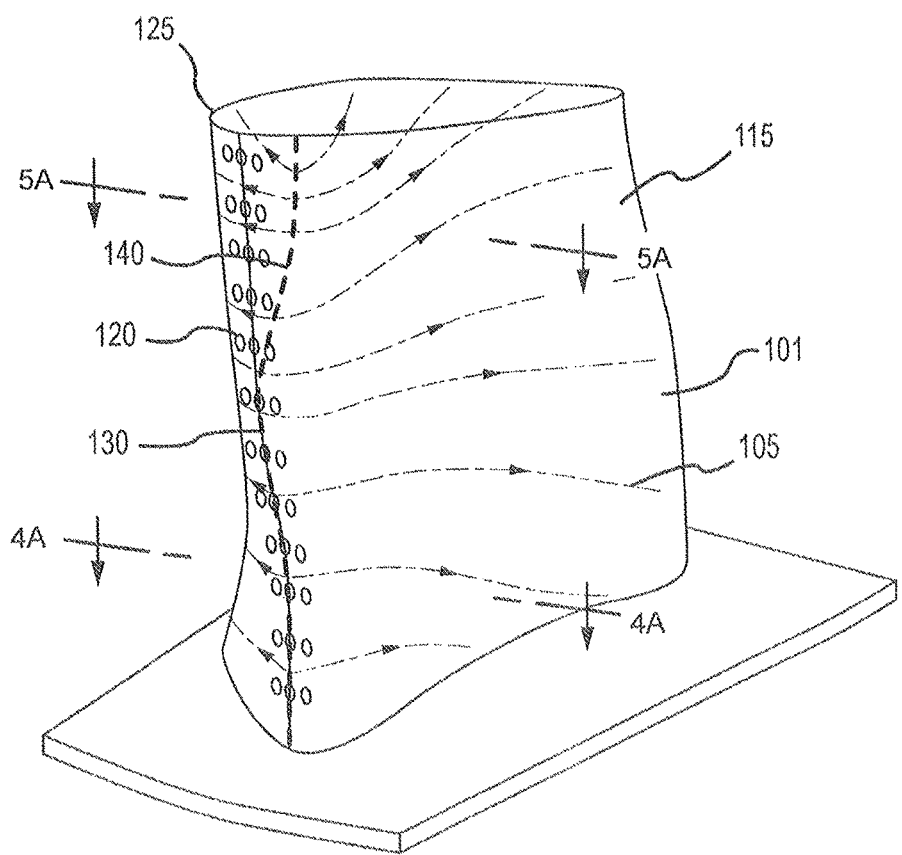
FIG. 3 illustrates a partial isometric view of gas turbine airfoil component.
Figure 4A:
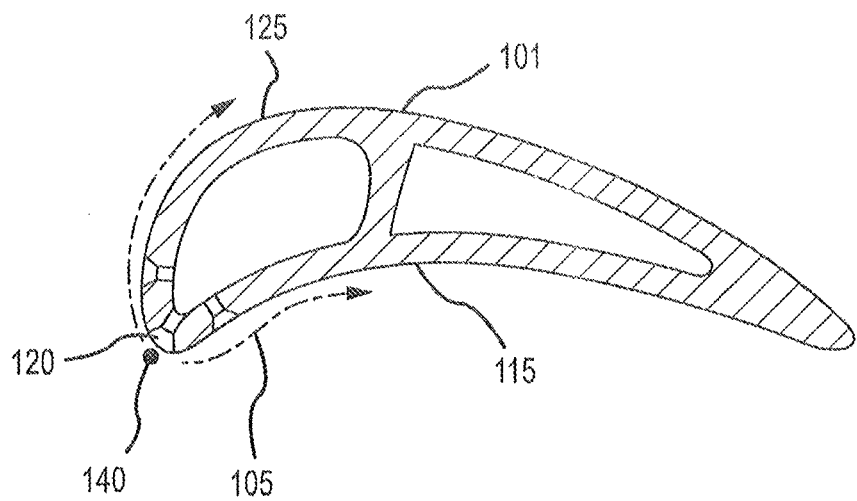
FIG. 4A illustrates the gas turbine airfoil component of FIG. 3 along cut plane 4A-4A.
Figure 4B:
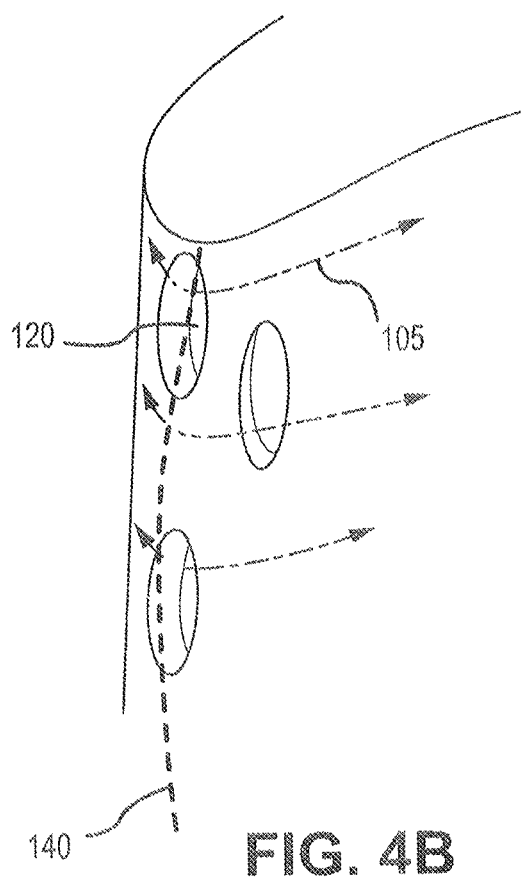
FIG. 4B illustrates a partial isometric view of the gas turbine airfoil component of FIG. 4A.
Figure 5A:
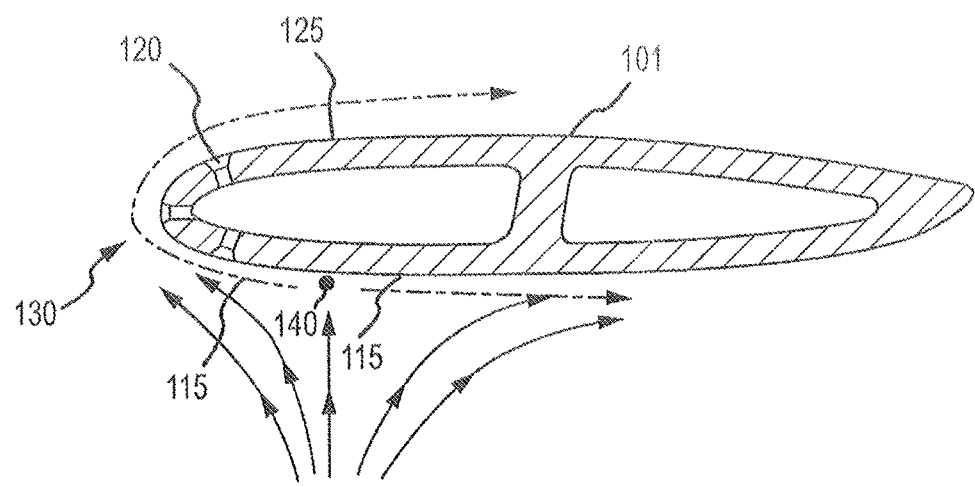
FIG. 5A illustrates the gas turbine airfoil component of FIG. 3 along cut plane 5A-5A.
Figure 5B:
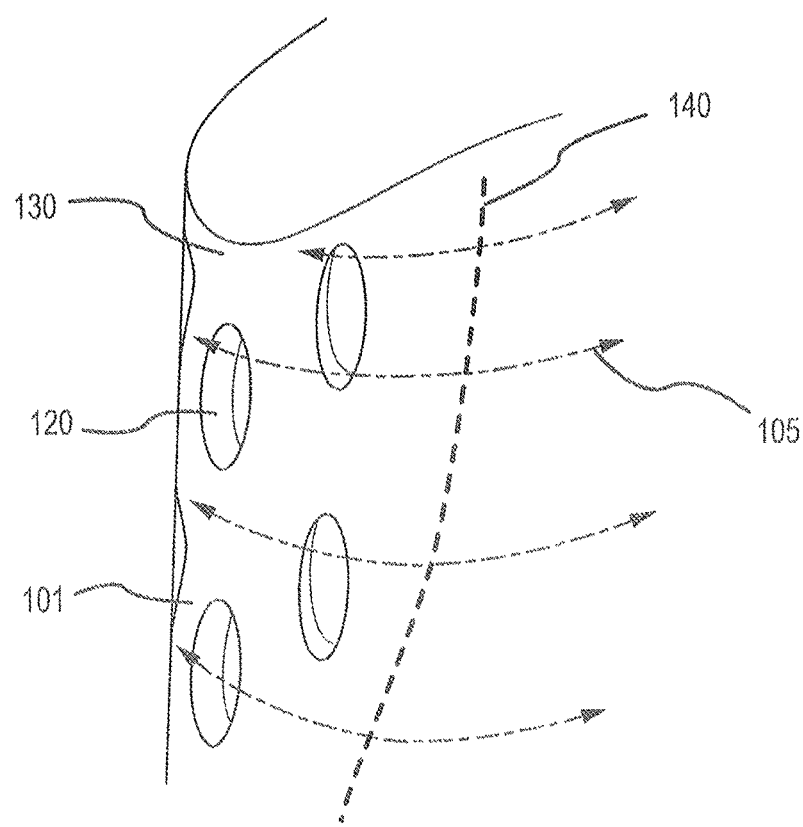
FIG. 5B illustrates a partial isometric view of the gas turbine airfoil component of FIG. 5A.

With reference to FIG. 2 a conventional airfoil 111 component is depicted. The stagnation zone 140 of the conventional airfoil 111 component coincides with the leading edge nose 130 for substantially the entire length of the airfoil. This is in contrast to the stagnation zone 140 and leading edge nose 130 of high lift airfoil designs where the stagnation zone 140 and leading edge nose 130 are offset.

Conventionally, and with reference to FIG. 3 through FIG. 5B, the cooling holes are oriented where the stagnation zone 140 and leading edge nose 130 of the airfoil 101 are aligned together. The stagnation zone 140 and/or line, as referred to herein, may reference a point and/or zone where oncoming gas first interacts with the airfoil 101. The stagnation zone 140 is where the pressure ratio, defined as the static pressure (PS) to total pressure (PT) ratio, equals one. In response to oncoming gas hitting stagnation zone 140, the streamlines 105 will accelerate to other parts of the airfoil 101 and the PS to PT pressure ratio will vary.

Traditionally, this stagnation zone 140 has a very high heat load due to the small radius of curvature and high acceleration of gas flow. To counteract against oxidation damage, multiple rows of cooling holes 120, called the "showerhead," are located in the stagnation zone 140. These holes are historically oriented in the radial direction, oriented 90 degrees to the streamlines 105. In some instances, the holes 120 comprise shaped diffusers to spread the flow. At the leading edge nose, the flow would diverge, one portion going aft towards the pressure side 115, while the other towards the suction side 125 of the vane or blade.

Figure 6A:
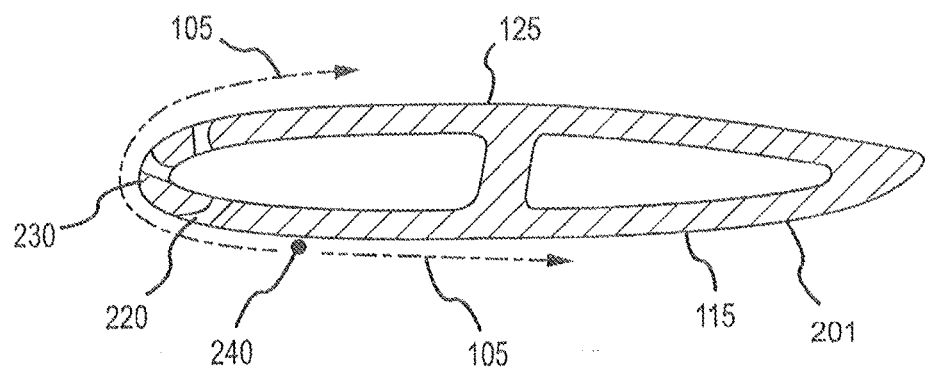
FIG. 6A illustrates a gas turbine airfoil component in accordance with various embodiments.

In accordance with various embodiments, and with reference to FIG. 6A, a high lift airfoil with tip vortex control is shown, where the stagnation zone 240 and the leading edge 230 may not necessarily align together. Stated another way, the stagnation zone and the leading edge of the high lift airfoil may be at least partially offset from each other. According to various embodiments, the stagnation zone 240 is on the pressure side, meaning a portion of the flow around the leading edge 230 is directed towards the suction side 125 of the vane or blade of the airfoil 101.

The systems and methods described herein adapt the orientation, position and/or diffusion angles of the showerhead holes 220 depending on the streamline 105 direction. In regions, for example, where the stagnation zone 240 is on the pressure side 115, the showerhead holes face aft (e.g., primarily towards the suction side 125). The location and positioning of the showerhead holes 220 may shift according to how the incoming streamlines 105 are directed. According to various embodiments, the shaped cooling showerhead holes 220, of the showerhead region, for example, comprises a constant diameter inlet section that functions as a metering section followed by a diffusion section located immediately downstream (towards the exit of the shaped cooling showerhead holes 220) in the streamline 105 flow direction from the metering section. The showerhead holes 220 are formed within the high lift airfoil 101 wall. The diffusion angle may be optimized based on the coolant flow field.

Figure 6B:
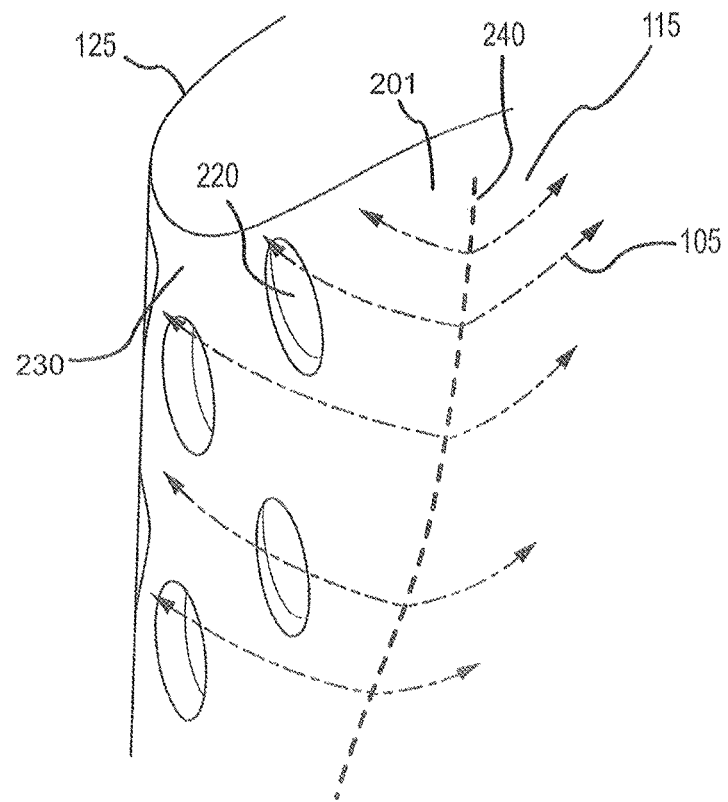
FIG. 6B illustrates a partial isometric view of the gas turbine airfoil component of FIG. 6A.

According to various embodiments, the stagnation zone 240 (and/or stagnation line) of the high lift airfoil 201 has at least partially migrated onto the pressure side of the airfoil 201 (see FIGS. 6A and 6B). Stated another way, the pressure distribution of the airfoil 201, (i.e., as a rotor blade or a stator vane) is different as compared to conventional airfoils 101. Thus, the showerhead holes 220 in the shower head region (e.g., leading edge 230 of the blade) if not aligned with the streamlines 105 may result in aerodynamic mixing losses that may penalize the engine efficiency, as well as poor film cooling effectiveness.

Thus, the systems and methods described herein illustrate alterations in the conventional design of the showerhead holes 220 in showerhead region due to variation in flow structure due to the high lift airfoil 201 design. This results in improved film attachment around the leading edge 230 and onto the suction side 125 airfoil 201. This also results in improved high temperature damage resistance and improved component lifespan. Improved engine efficiency is also experienced due to the systems and methods described herein, as the showerhead holes 220 are oriented closer to parallel with the external gas streamlines 105. By having the cooling hole air flow vector direction closer to parallel, there is a reduction aerodynamic mixing loss between the streamlines 105 and the external gas.

Also, a reduction in cost may be observed due to the systems and methods described herein. With better cooling around the leading edge 230 to the suction side 125, less showerhead holes 220 may be required to cool the suction side 125. If the showerhead holes 220 were laid out like the conventional design, poor film decay would be expected, therefore more showerhead holes 220 would be placed downstream to reduce suction side 125 metal temperatures.

Thus, the systems and methods described herein may result in cost reduction, cooling flow reduction opportunities, and for life improvement (by increasing cooling effectiveness). Additive manufacturing or cast-in cooling holes may also enable the systems and methods described herein to be applicable to next generation airfoils 201. Additive manufacturing as used herein refers to any of the various processes for printing a three-dimensional object. Primarily, additive processes are used, in which successive layers of material are laid down under computer control. Additive processes may include depositing wire or powder with lasers. Electric discharge machining (EDM) may also be utilized. EDM is a manufacturing process whereby a desired shape is obtained using electrical discharges. Additive processes may include laser drilling.

According to various embodiments, the showerhead holes 220 of the showerhead region are oriented in a way where the vector of the air flow exiting the showerhead holes 220 aligns or at least partially aligns with the streamlines 105 of the cooling flow. For instance, in contrast to the exit vectors of the conventional systems that were aligned 90 degrees from the streamlines 105, the present systems and methods describe the exit vectors of the showerhead holes 220 between about 45 to 90 degrees from the radial direction of the airfoil 201 vane or blade. In this way, as depicted in FIG. 6B, the showerhead holes 220 are aligned with the streamlines 105 of the cooling flow. According to various embodiments, the showerhead holes 220 may be curved to orient the flow of cooling air out of the showerhead holes 220 in a direction closely aligned with the cooling flow streamline 105. For instance, a curved cooling hole metering section may be formed via an additive manufacturing technique of the airfoil 201. Similarly, using an additive manufacturing technique, the showerhead holes 220 may direct a vector of cooling air between about 0 and 90 degrees from the radial direction as measured from an attachment to a hub of the vane or blade of the airfoil 201. According to various embodiments, the showerhead holes 220 may each comprise a substantially equivalent diffusion angle into the surface.

The point 605 of the forward edge of the breakout opening of showerhead holes 220 and the point 610 of the aft most edge of the breakout opening of showerhead holes 220 may define a line which is between about 0 and 90 degrees from the radial direction of the vane or blade. This line may be closely alighted with the streamline flow 105. According to various embodiments, the rows of showerhead holes 220 oriented about 0 and 90 degrees from the radial direction of the vane or blade of the airfoil 201 may not span the entire radial span of a vane and/or a blade. For instance, the radial distance of one or more radial rows of showerhead holes 220 may be a partial span. The radial distance may be between about 0-100% of the radial direction of the blade or vane. The geometry of the shape of a breakout of holes in a row along a radial span of holes may vary. For instance, towards the distal end (e.g., away from an attachment surface) of a row in the radial direction a row of showerhead holes 220 may comprise a conventional breakout shape, similar to the hole breakout orientations depicted in FIG. 3, and then vary to one of the hole breakout orientations depicted in FIG. 6B.

Cooling air may be ejected from the showerhead holes 220, such as showerhead cooling holes described herein. The showerhead holes 220 may be configured to produce a layer of cooling air that flows over the leading edge surface to protect the material surface from excessive exposure to the high temperature hot gas flow. The cooling air may be ejected in a non-radial direction of the blade or vane of the airfoil 201. A portion of the cooling air will thus migrate towards a stagnation zone 240.

Benefits, other advantages and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine component having a showerhead cooling hole comprising:
    a row of radially disposed showerhead cooling holes,
    wherein the row of radially disposed showerhead cooling holes are configured to alter a vector of cooling air to align with a cooling flow streamline towards a leading edge nose of the gas turbine component,
    wherein the row of radially disposed showerhead cooling holes is disposed on a high lift airfoil comprising a Zweifel lift coefficient of greater than 1.1.

2. The gas turbine component having the showerhead cooling hole of claim 1, wherein the showerhead cooling hole is located on at least one of the leading edge, pressure side, or suction side of the gas turbine component.

3. The gas turbine component having the showerhead cooling hole of claim 1, wherein the row of radially disposed showerhead cooling holes is disposed on a leading edge of at least one component.

4. The gas turbine component having the showerhead cooling hole of claim 1, wherein the gas turbine component, including the row of radially disposed showerhead cooling holes, is formed through at least one of an additive manufacturing process or and electric discharge machining process.

5. The gas turbine component having the showerhead cooling hole of claim 1, wherein the row of radially disposed showerhead cooling holes are curved to orient a flow of cooling air out the showerhead cooling hole in a direction closely aligned with the cooling flow streamline.

6. The gas turbine component having the showerhead cooling hole of claim 1, wherein the row of radially disposed showerhead cooling holes are configured to alter the vector of cooling air to align with the cooling flow streamline towards a suction side.

7. The gas turbine component having the showerhead cooling hole of claim 1, wherein the gas turbine component is a turbine blade.

8. An airfoil component comprising:
    an airfoil portion that bounds void, wherein the void comprises a cooling hole, wherein the cooling hole comprises a diffusion angle, wherein the cooling hole is configured to alter a vector of cooling air to align with a cooling flow streamline towards a leading edge of the airfoil component, and wherein the cooling hole is located in close proximity to the leading edge of the airfoil component,
    wherein the airfoil component is a high lift airfoil comprising a Zweifel lift coefficient of greater than 1.1.

9. The airfoil component of claim 8, wherein the cooling hole is configured to alter the vector of cooling air away from a suction side or pressure side stagnation zone.

10. The airfoil component of claim 8, wherein a stagnation zone and the leading edge of the high lift airfoil are offset.

11. The airfoil component of claim 8, wherein the airfoil component is formed through at least one of an additive manufacturing process or and electric discharge machining process.

12. The airfoil component of claim 8, wherein the airfoil component is a turbine blade.

13. A method of vectoring cooling air flow comprising:
    disposing a row of a plurality of cooling holes radially on an airfoil component; and
    orienting a breakout of a cooling hole of the plurality of cooling holes at an angle to substantially align the angle with a direction of a cooling flow streamline,
    wherein the airfoil component is part of a high lift airfoil, wherein the high lift airfoil comprises a Zweifel lift coefficient of greater than 1.1.

14. The method of claim 13, wherein the airfoil component is a turbine blade.

15. The method of claim 13, further comprising altering a vector of a cooling air streamline away from at least one of a suction side or pressure side stagnation zone.

* * * * *